United States Patent

Weiser et al.

[11] Patent Number: 5,786,819
[45] Date of Patent: Jul. 28, 1998

[54] ONE BUTTON SEARCHING OF LONG LISTS

[75] Inventors: Mark D. Weiser; Jock D. Mackinlay, both of Palo Alto, Calif.

[73] Assignee: Xerox Corporation, Stamford, Conn.

[21] Appl. No.: 665,068

[22] Filed: Jun. 11, 1996

[51] Int. Cl.$^6$ .................................................. G06F 7/10
[52] U.S. Cl. ............................................. 345/354; 345/352
[58] Field of Search ................................. 345/352, 353, 345/354, 355, 326, 339, 340, 336, 356

[56] References Cited

U.S. PATENT DOCUMENTS

| | | | |
|---|---|---|---|
| 4,908,853 | 3/1990 | Matsumoto | 379/355 |
| 5,206,949 | 4/1993 | Cochran et al. | 345/352 |
| 5,351,190 | 9/1994 | Kondo | 704/8 |
| 5,428,735 | 6/1995 | Kahl et al. | 345/326 |
| 5,455,926 | 10/1995 | Keele et al. | 395/404 |
| 5,517,606 | 5/1996 | Matheny et al. | 345/326 |
| 5,551,055 | 8/1996 | Matheny et al. | 395/882 |
| 5,559,707 | 9/1996 | DeLorne et al. | 364/443 |
| 5,588,102 | 12/1996 | Bowden et al. | 345/344 |
| 5,623,591 | 4/1997 | Cseri | 345/326 |
| 5,624,265 | 4/1997 | Redford et al. | 434/307 |

OTHER PUBLICATIONS

Simpson, *Mastering WordPerfect® 5.1 & 5.2 for Windows*™, Alameda, Ca., 1993, Chapter 17.

*Primary Examiner*—Raymond J. Bayerl
*Assistant Examiner*—Steven P. Sax
*Attorney, Agent, or Firm*—Robert A. Burtzlaff

[57] ABSTRACT

A method for one button searching long lists is initiated by depressing a first search button to initiate a first mode scrolling search of a plurality of list members ordered in a list. Each list member is sequentially displayed on a small display, with the display typically being a handheld device capable of simultaneously displaying ten lines of alphanumeric characters. A second mode scrolling search is initiated after maintenance of the first search button in a depressed state and elapse of a first predetermined time interval of about one second. In the second mode scrolling search, a selected subset of list members, each having a same first letter, is ordered by their second letters for sequential display. A third mode scrolling search commences after maintenance of the first search button in a depressed state and elapse of another second, with selected subset of list members ordered by their first letter for sequentially display. Upon button release in either second or third mode, the search mode reverts to the next lower mode, with third mode going to second mode, and second mode going to first mode.

11 Claims, 5 Drawing Sheets

ONE BUTTON SEARCHING OF LONG LISTS

FIELD OF THE INVENTION

The present invention relates generally to a computer user interface for data presentation to a computer user. More particularly, the present invention relates to a single button list scrolling system for presenting data in visual displays of limited size.

BACKGROUND AND SUMMARY OF THE INVENTION

Currently available portable computing devices include laptop, notebook, subnotebook, handheld computers, personal digital assistants, palmtops or personal organizers. Along with a processor, memory, and long term memory storage unit, these devices typically have a small keyboard or handwriting recognition unit and an alphanumeric or graphical display. Electronic address books, contact managers, or even databases maintaining inventory and price lists are typical supported software applications. Using keyboard input, mouse, trackpad, or cursor control, a user interacts with application software in essentially the same manner as the user would while running the software on a conventional desktop computers. For example, a user can search an electronic address book by using a small keyboard or handwriting recognition unit to type (or write) desired person's name or portion of a name. An alphanumerically ordered database, possibly containing that name, is searched. If the search is successful, information related to the person's address, telephone number, or email address is displayed.

With some limitations, typically attributable to small keyboard or display screen size, software developed for desktops can run on the larger portable computers. Unfortunately, mapping software input and display techniques developed for desktop computing onto portable computing devices smaller than palmtop computers or personal digital assistants is not as feasible. If a portable computing device is not large enough to support an alphanumeric keyboard display, or at least have sufficient processor power to support handwriting recognition, most conventional computer interface techniques relied upon for desktop software applications will not be very effective. This is especially true for those software applications that rely on scrolling presentation techniques for displaying large lists of data.

In a desktop or portable computer having alphanumeric input and large display screen, a scrolling presentation shows a small portion of a large list that ordinarily would be too large to display on a monitor screen. In a common type of scrolling window application, a user accesses a members of a list by clicking on opposing "up" and "down" arrow keys in a scroll bar to rewrite the display with new choices that are alphabetically ordered before or after the currently displayed scrolling window. Unfortunately, this may require a user to endure multiple screen rewrites to scroll through a long list of menu choices, and is impractical when lists contain several thousand or more items. As a shortcut, it is often possible to directly type in the first few letters of a putative list member to cause the scrolling screen to display that list member, along with some alphanumerically adjacent list members. Alternatively, some applications allow use of cursor control on a separate scroll bar to move down the list in large leaps. Although use of this type of cursor control shortcut often requires a guess as to where in a list a desired list member may be found, it is generally faster than simple downward (or upward) scrolling through the list.

However, if the portable computing device is too small for a keyboard or large display (i.e., a display incapable of showing in a single screen more than about ten lines of alphanumeric data), alternative user interface techniques that do not require alphanumeric input or cursor control for scrolling through long lists of data are required. Such techniques must be fast, effective, and easy to learn. Further, such techniques must be simple to implement for various types of list data structures. Ideally, only use of a single button would be required to scroll through a list to reach a desired list member.

Accordingly, the present invention reduces problems associated with displaying long lists on portable computing devices lacking alphanumeric keyboard input by providing a novel user interface method for accessing members of a large ordered data set, including but not limited to alphabetically or alphanumerically ordered list members in a list. The list can be quite large, with the number of list members in the tens of thousands, hundreds of thousands, or even millions being searchable. Although the present method works well in conjunction with displays having less than ten lines, being of particular utility in conjunction with extremely small one, two, or three line displays, it will of course work in conjunction with larger displays. The method of the present invention requires the use of only a single button to scrollably search an alphanumerically ordered list, making it ideal for use in conjunction with a conventional mouse, up/down key, or pressure sensitive pad, although of course additional buttons might be available, including alphanumeric keyboards or other user input devices.

The method of the present invention is initiated by depressing a first search button (or other conventional user input device capable of maintaining a signal for some duration) to initiate a first mode scrolling search of a plurality of list members alphanumerically ordered in a list. Each list member is sequentially shown on a small display, with the display typically being a handheld device capable of simultaneously displaying ten lines or less of alphanumeric characters. A second mode scrolling search is initiated after maintenance of the first search button in a depressed state and elapse of a first predetermined time interval of about one second. In the second mode scrolling search, a selected subset of list members, each having a same first letter, is alphabetically ordered by their second letters for sequential display. A third mode scrolling search commences after maintenance of the first search button in a depressed state and elapse of second predetermined time interval (also about one second in duration), with selected subset of list members alphabetically ordered by their first letter for sequentially display. Upon button release in either second or third mode, the search mode reverts to the next lower mode, with third mode going to second mode, and second mode going to first mode.

In preferred embodiments, a selection button distinct from the first search button is used to select a list member displayed on a selection line. In addition, a second search button can be used to initiate scrolling search through the plurality of list members alphanumerically ordered in a list in a reverse alphabetical order. The use of the described method is most advantageous in small portable computing devices capable of interacting with much larger computer network based databases through a wireless transmission and reception link. Potentially very large databases can be easily searched even without the advantage of keyboard input or cursor control for narrowing selection of list members.

Accordingly, while this novel search method can be used in conjunction with desktop computers or portable computers having keyboard input, it is of particular utility in conjunction with very small (typically less than 10 to about 100 cubic centimeters) electronic devices that can be termed "personal storage devices". A personal storage device provides a user with the ability to customize or transfer small amounts of data (typically in the range of 128 kilobytes to 1 Megabyte) to many different machines through a wireless link (usually infrared or radio), without needing to carry a relatively large and expensive personal digital assistant, palmtop, or laptop computer. Applications such as electronic address books, contact managers, or databases can run on a personal storage device. The personal storage device is configured to be small enough to be attached to a keychain or kept unobtrusively in a pocket, or purse. Typically, the personal storage device contains a small, modestly powered microprocessor, a one to ten line alphanumeric display, and a memory subsystem that can execute communication protocols, accept downloadable applications or data "on the fly" and display, manage, process, transmit, receive, or encrypt data useful to a user.

Advantageously, the ability to transmit requests and accept downloadable data allows a user of a personal storage device to interact with extremely large databases maintained on wireless link accessible network computers. For example, using methods of the present invention and conventional remote procedure calls, a database containing a national telephone address book with millions of entries could be searched and presented to a user through the relatively small display of the personal storage device, even though only a small subset of the database is stored in the memory of the personal storage device at any particular time, all without requiring any alphanumeric input from the user.

Additional functions, objects, advantages, and features of the present invention will become apparent from consideration of the following description and drawings of preferred embodiments.

DETAILED DESCRIPTION OF THE INVENTION

Figure 1:
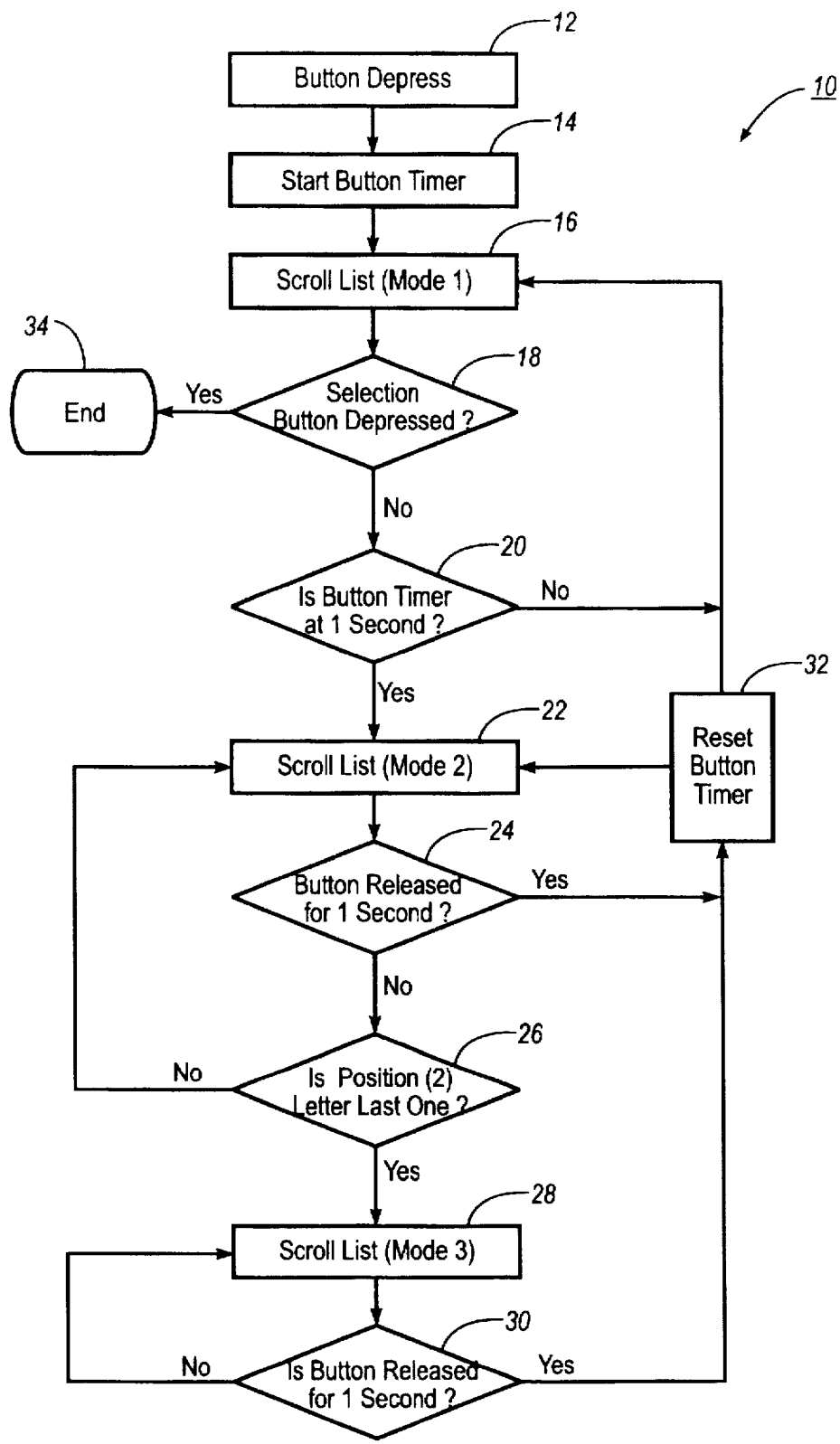
FIG. 1 is flow diagram generally illustrating certain steps in a method for searching long lists using a single button input.

FIG. 1 is a flow diagram illustrating certain method steps for providing an efficient, one button user interface for searching through an ordered list. The ordered list may be ordered alphabetically, alphanumerically, chronologically, or in any other convenient ordering scheme that allows a user to have implicit awareness of omitted members in a list when all list members are not displayed. In the following description of the invention only alphabetically or alphanumerically ordered lists will be discussed.

Although only one button is required for scrolling type searching of an ordered list, additional buttons may be available for selecting a search item or for determining direction of list search. For convenience sake, a button for initiating search downward through an alphanumerically ordered list (i.e. "A to Z") will be termed a "down" button, a button for initiating search up through the list (i.e. "Z to A") will be termed an "up" button, and a button for selecting a particular list member will be termed a "selection button". Even though multiple buttons are recited in the description, only single, double, or triple physical buttons may be required, depending on the mode of button interaction and the particular physical user interface. As those skilled in the art will also appreciate, the term "button" itself is intended to apply to any input mechanism for providing a processor interpretable signal. Such a signal should have a definable start, finish, and measurable time duration. The present invention is not limited to any particular type of button design or action.

As seen in FIG. 1, search method 10 begins with depression of a "down" button 12 that initiates search of a large alphabetical list, corresponding to what might be found in an electronic address book storing telephone numbers and e-mail addresses of employees of a large corporation. A button timer 14 with at least tens of milliseconds resolution is started to track the duration of button depression, and a (Mode 1) scroll listing 16 to display the alphabetical list begins. In Mode 1, each name in a list is moved upward one line of the available display screen, with new names appearing at a bottom of the screen, and old names disappearing at the top of the screen. The scrolling speed can be adjusted by a user, but will typically be about 100 milliseconds between each upward scroll, allowing sufficient time for a user to recognize new names as they are scrolled into view on the display. This mode is similar to conventional scrolling such as might be found in any desktop word processing or database software application. The topmost line in a display is typically a selection line, and if a selection button is depressed (diamond box 18), further action or information is initiated on the basis of the name (list member) on that selection line, ending the search (box 34).

As seen with reference to diamond box 20, if no selection button has been depressed, and after about one second of normal scrolling in Mode 1, the display mode changes to (Mode 2) scroll listing 22. Mode 2 is a leap scrolling mode, with each line displaying a first member of a set of names having a change in the second letter of the name. For example, "Aaa" is followed by "Aba", omitting any intervening name entries such as "Aab" or "Aam". In a preferred display embodiment, the first two letters of a name are capitalized, and separated by a space from the remaining letters of the name to improve search efficiency.

As seen with reference to diamond box 24, if the button is released in Mode 2 for about one second, the button timer is reset to zero (box 32) and search Mode 1 is reentered, with the name on the selection line at button release becoming the first listed name. If the button is not released, or is depressed again within about one second, the listing in Mode 2 continues until the last alphabetical letter in the second position of a name (the second letter in a name, e.g. the "z" in "Aza") is reached (diamond box 26), whereupon (Mode 3) scroll listing 28 commences.

Like Mode 2, Mode 3 scrolling is also a form of leap scrolling with omitted members of a list implicitly existing between the displayed list members. In Mode 3 scrolling, each upward scroll sequentially displays a list member having a subsequent first letter (e.g. "Aaa" followed by "Baa" until "Zaa" is reached). Scrolling is cyclical, with the alphabetically last displayed member being followed by the alphabetically first ("Zaa" is followed by "Aaa") until the button is released for about one second (diamond box 30). The one second pause allows a user to select a list member with a selection button, or to repress the button and continue at that search level if the button depression is inadvertently not maintained. The user can single-step through a list in any mode by pressing the button briefly and repeatedly. This is advantageous when close to the desired list item, or if the user has trouble reading the text during a fast list scroll. If no selection is made, search Mode 2 is reentered after resetting the button timer (box 32), with the name on the selection line at button release becoming the first listed name in Mode 2.

Use of the foregoing described one button searching technique is simple and intuitive. A user can push an up or a down button to search forward or backward in the alphabet from the current position in the list, with the modes automatically shifting based on timing alone. Modes are "sticky" for about one second, to prevent inadvertent shifting between modes and to help the user read list items and single-step without leaving a desired mode. In use, searching a 20,000 name list requires less than about 10 seconds. In an average search of such a list, with about 30 names beginning with any given first two letters, it requires:

1 second to enter Mode 2 after button depression;

2.6 seconds to enter Mode 3;

1.3 seconds to find the correct first letter;

1 second of pause to return to Mode 2;

1.3 seconds to find the correct second letter in Mode 2;

1 second of pause to return to Mode 1; and 1.5 seconds to find the correct name.

Cumulatively, this requires only about 9.7 seconds to search a 20,000 name list without requiring explicit alphanumeric input such as provided by a keyboard.

Figure 2:
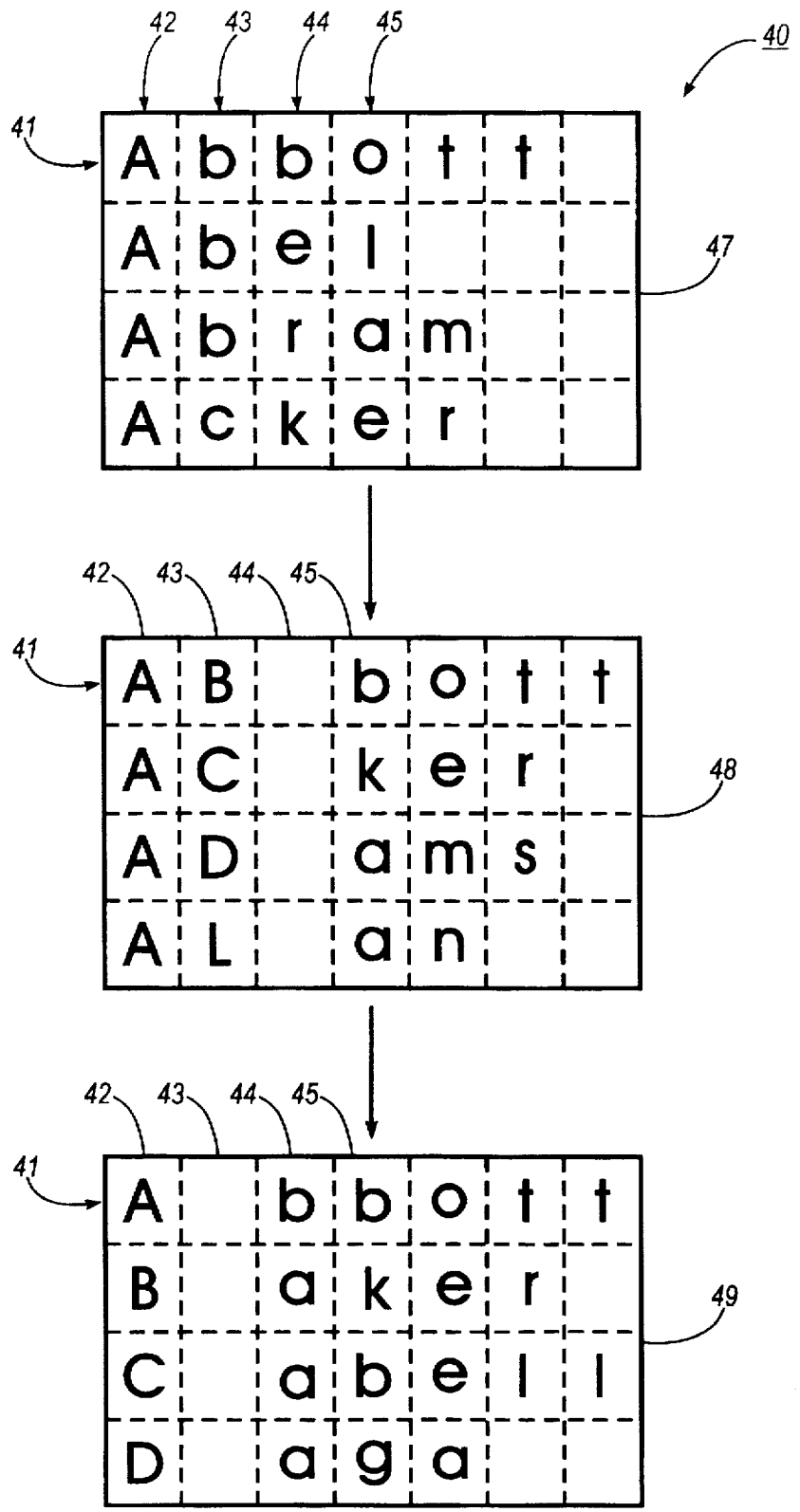
FIG. 2 illustrates several example four line screen displays in various search modes according to the present invention.

A series of typical display screens that would be displayed to a user during a search such as discussed in connection with FIG. 1 is shown in FIG. 2. The dotted lines in the display separating the alphanumeric characters into discrete lines and columns are not actually present in the display, but are intended to better discriminate lines and columns for the purpose of the present disclosure. A screen display 40 is consecutively illustrated in Mode 1 (display 47), Mode 2 (display 48), and Mode 3 (display 49). In this illustration, the display 40 is capable of displaying twenty-eight alphanumeric characters in four lines (with the topmost line 41 being the selection line) and seven columns (columns 42, 43, 44, and 45 being indicated by number). As will be appreciated, the is number of lines, columns, and spacing is purely exemplary, and can be substantially varied.

As illustrated in Mode 1 (display 47) four different names in an alphabetical list are displayed, with the first letter in column 42 being capitalized, while the remaining columns display small case letters. In Mode 2 (display 48), the first two letters (respectively in columns 42 and 43) are capitalized, and a space is left in column 44 between the capitalized letter in column 43 and the small case letter in column 45. This display convention, while not necessary, is intended to visually indicate that Mode 2, with search display by the second of the first two letters, is being employed. The Mode 3 display also has a unique display convention as seen with reference to display 49. The first letter in column 42 is capitalized, the second column 43 is left as a blank space, and the third column 44 (along with the remaining columns) provides the rest of a listed name in small case letters.

As those skilled in the art will appreciate, the previous display conventions, while preferred, are not required for operation of the present invention. Spacings between columns can be omitted, or additional distinguishing display formats, including the use of color or visible lines.

The present invention is of particular utility in conjunction with very small (typically less than 10 to about 100 cubic centimeters) electronic devices that can be termed "personal storage devices". A personal storage device provides a user with the ability to customize or transfer small amounts of data (typically in the range of 128 kilobytes to 1 Megabyte) to many different machines through a wireless link (usually infrared or radio), without needing to carry a relatively large and expensive personal digital assistant or a laptop computer. Applications such as electronic address books, contact managers, or databases can run on the personal storage device. The personal storage device is configured to be small enough to be attached to a keychain or kept unobtrusively in a pocket, or purse. Typically, the personal storage device contains a small, modestly powered microprocessor, a one to ten line alphanumeric display, and a memory subsystem that can execute communication protocols, accept downloadable applications or data "on the fly" and display, manage, process, transmit, receive, or encrypt data useful to a user. A personal storage device can be maintained in continuous or intermittent wireless communication with a number of suitably equipped electronic devices, including desktop personal computers, personal digital assistants, notebook computers, or computer workstations. In addition, by connection to any of the foregoing network connectable electronic devices, or by connection through dedicated gateway computers, the personal storage device can be connected to a local or wide area computer network. This allows the personal storage device access to large amounts of computing power and data resources that would be impracticable in a standalone, non-wireless connected device. In preferred embodiments wireless communication with the personal storage device utilizes infrared signals adhering to widely utilized IRDA communication standards, although alternative communication standards, or even alternative communication carriers such as radiofrequency, optical, or acoustic can of course be employed.

Figure 3:
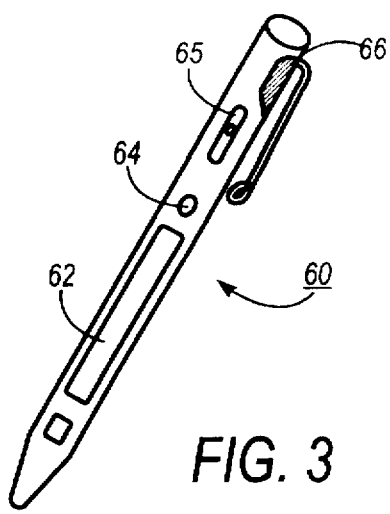
FIGS. 3, 4, and 5 illustrate various display and input personal storage devices suitable for use with the present invention.
Figure 4:
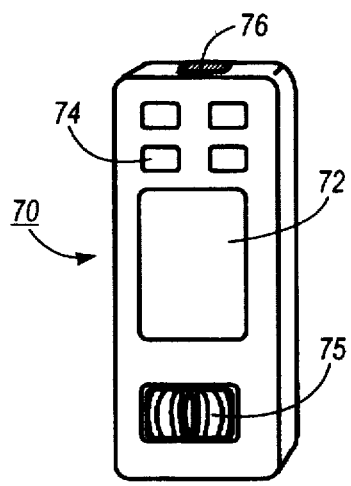
Figure 5:
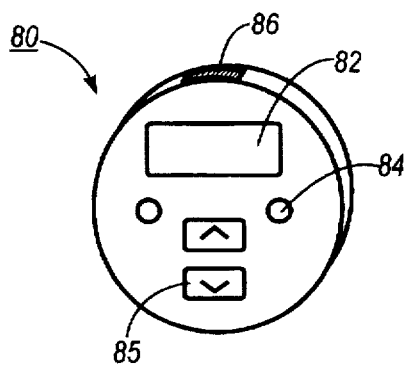

As will be appreciated, the exact form, user interface, and contents of a personal storage device in accordance with the present invention can be widely varied to suit the needs of a user. For example, FIG. 3 illustrates a roughly pen shaped personal storage device 60 optimized for clipping to a shirt pocket. Two buttons 64 and a slide 65 provide user input, with an infrared transceiver 66 being used for wireless communication, and display 62 used for showing brief messages or confirmations. Alternatively, a somewhat larger form factor rectangular personal storage device 70 more suitable for clipping to a user's belt is illustrated in FIG. 4. Device 70 is controlled with buttons 74 and a thumbwheel 75, with a much larger (as compared to device 60) display 72 being available to display information received through transceiver 76. Yet another form for a personal storage device 80, that of a circular disk, is illustrated in FIG. 5. Again, this device supports a transceiver 86 and buttons 84, with marked arrow buttons 85 being used for scrolling through lists on display 82. Because of size constraints in such personal storage devices, use of alphanumeric input, or display sizes greater than about ten lines, is typically not available. As will be appreciated by consideration of the foregoing embodiments, a wide variety of embodiments, including embodiments having non-utilitarian or decorative aspects, can present a suitable physical form for supporting functionality of a personal storage device.

Figure 6:
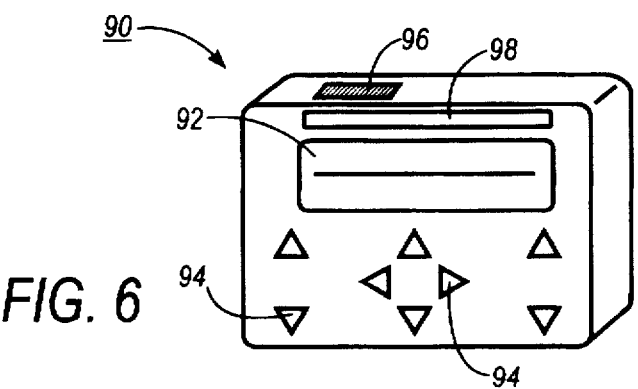
FIG. 6 illustrates a preferred personal storage device, having a plurality of buttons for a user input, and a two line alphanumeric display for output.

A presently preferred personal storage device 90 is illustrated in FIG. 6. This illustrated embodiment is a rectangular solid, having dimensions of about 4 centimeters wide, 2.5 centimeters long, and about 1 centimeter thick, giving a volume of about 10 cubic centimeters. The casing of personal storage device 90 can be constructed from aluminum, stainless steel, or crush resistant/high durability plastics. The size of personal storage device 90 is much smaller than typical personal digital assistant, which typically have a volume greatly in excess of 100 cubic centimeters, and dimensions much greater than the "key chain" or pocket sized form of the present device.

Personal storage device 90 supports a two line, black and white LCD alphanumeric display 92. Commonly available inexpensive displays permit presentation of sixteen alphanumeric characters on each of the two lines, but more expensive displays having twenty or more alphanumeric characters, supporting up to ten (or more) lines of alphanumeric data, or having color capability, can of course be used if necessary. Buttons 94 can be used for initiation and control of tasks such as list scrolling according to the method of the present invention, menu selection, program execution, or data transmission. In addition, it is possible to provide analog input devices such as a touch sensitive strip 98 to provide a user with additional control options.

Figure 7:
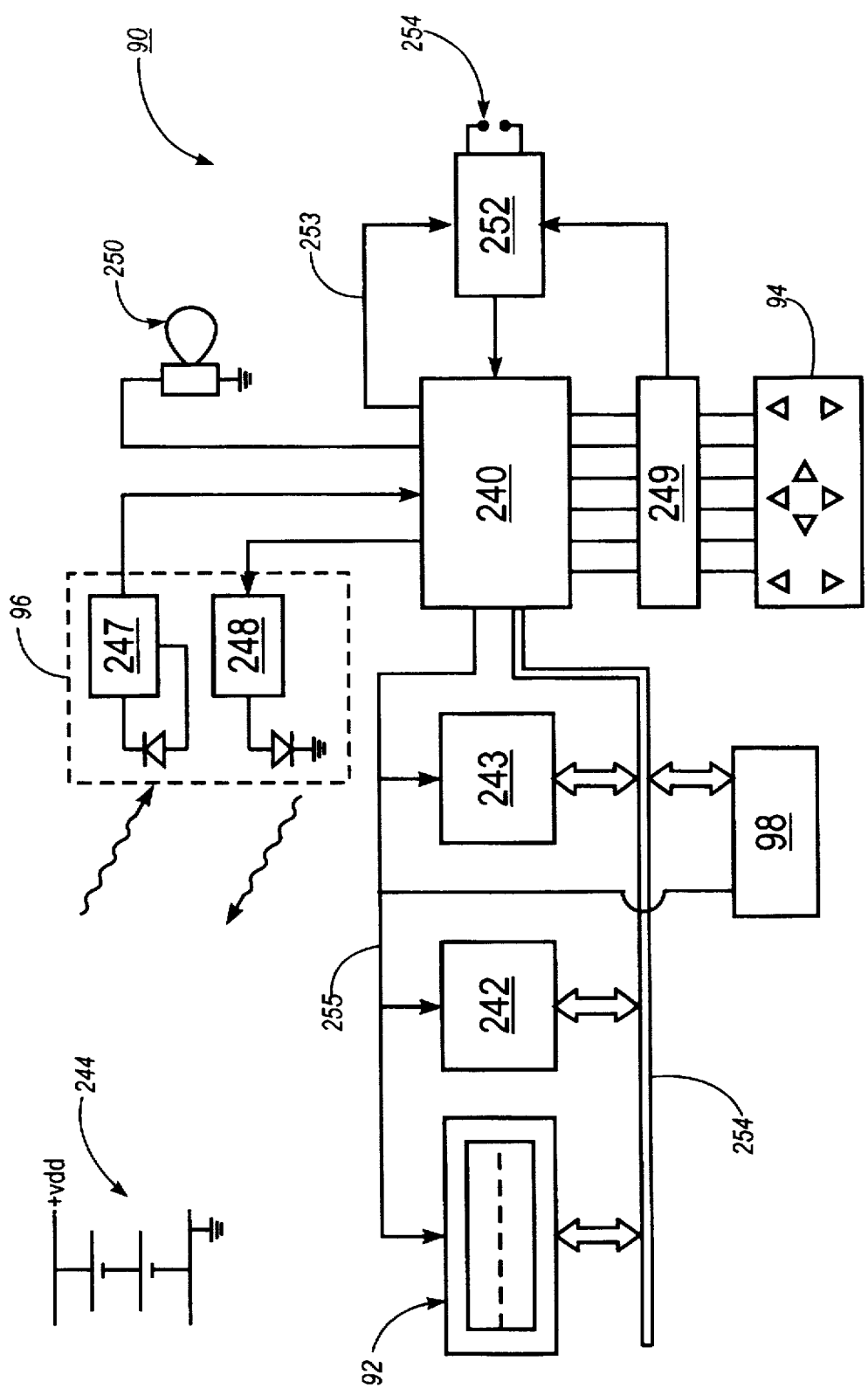
FIG. 7 is a detailed electronic schematic of the personal storage device illustrated in FIG. 6.

An electronic schematic of the personal storage device 90 is illustrated in FIG. 7. In preferred embodiments, most elements are mounted on a circuit board that is later positioned in a protected position within the crush resistant casing, with user interface elements such as a display screen 92 and buttons 94 projecting from the casing cavity to permit user access. In one preferred embodiment, the processor 240 consists of a low power microcontroller, such as the 8051 type microcontroller, the memory 242 is a low power CMOS RAM having 128 KB of storage, and the clock 243 is a standard clock such as the PCF8593 by Philips. A 32 character display 92 having two rows of characters 16 characters in length is also provided, with the display 92, memory 242, and clock 243 controlled by processor 240 through a control bus 255. Addresses and data are passed along a data bus 245. Wireless transmission and reception of data and executable applications is provided by infrared transceiver 96, which includes transmitting LED and connected infrared transmitter driver 248, and a receiving LED and infrared receiver amplifier 247 connected to processor 240. Auditory signaling is also enabled by provision of a piezoelectric speaker 250 connected to processor 240. This can be used to provide tones that signal certain states of the device 90 to the user or with suitable Pulse Position Modulation (PPM) can generate telephone quality DTMF tones for the purpose of dialing numbers contained in stored data. Higher quality DTMF tones can be produced by a standard part (PCD3312) connected to the control bus and drive the piezoelectric speaker 250 directly.

A reset control module 252 is connected to the processor. When the processor 240 enables the reset control module 252, any switch press signal received from switch interface 249 resets the state of the processor 240. Reset can also occur by manual activation of a reset switch 254. User control of the personal storage device occurs primarily through operation of switches 94, which are connected to the switch interface 249. Additional user control can be provided by a touch sensitive strip, thumbwheel, or other device connected to a analog to digital converter 98 (which may be, for example, a PCF8591 converter 244, typically consisting of a pair of 3 volt lithium cells, or alternatively, by a single 3 volt lithium cell and an attached 3 volt to 5 volt converter.

Operation of the foregoing embodiment of a personal storage device 90 is illustrated with reference to FIG. 7. The 8051 microcontroller has a built-in power-down mode of operation utilized by the device 90. When the device 90 is not in use receiving information, processing data, or transmitting information, it is maintained in a power-down mode to conserve the limited available power supply. To bring the device 90 out of this power down mode, reset control module 252 must be triggered. The switch interface 249 is designed to detect any switch press and initiate a reset to the processor 240, at which point it will execute code that disables further reset signals from the switch interface module 249 by asserting the reset inhibit control signal 253. Once in the powered up state, all the processor peripherals (e.g. display 92, transceiver 96) are powered-up, and a timer is started. If there is no communication, or switch activity, for a set period of time (currently about 45 seconds) the processor 240 will disable the reset inhibit control signal 253, turn off all the processor peripherals, and enter the power-down mode by setting a bit in the processor's 240 PCON register. In addition to this switch based reset procedure, the processor 240 can also receive a reset signal as the result of applying power (for example, by changing the batteries) or pressing a manual reset button accessible in emergencies through a small hole in the case of device 90.

Figure 8:
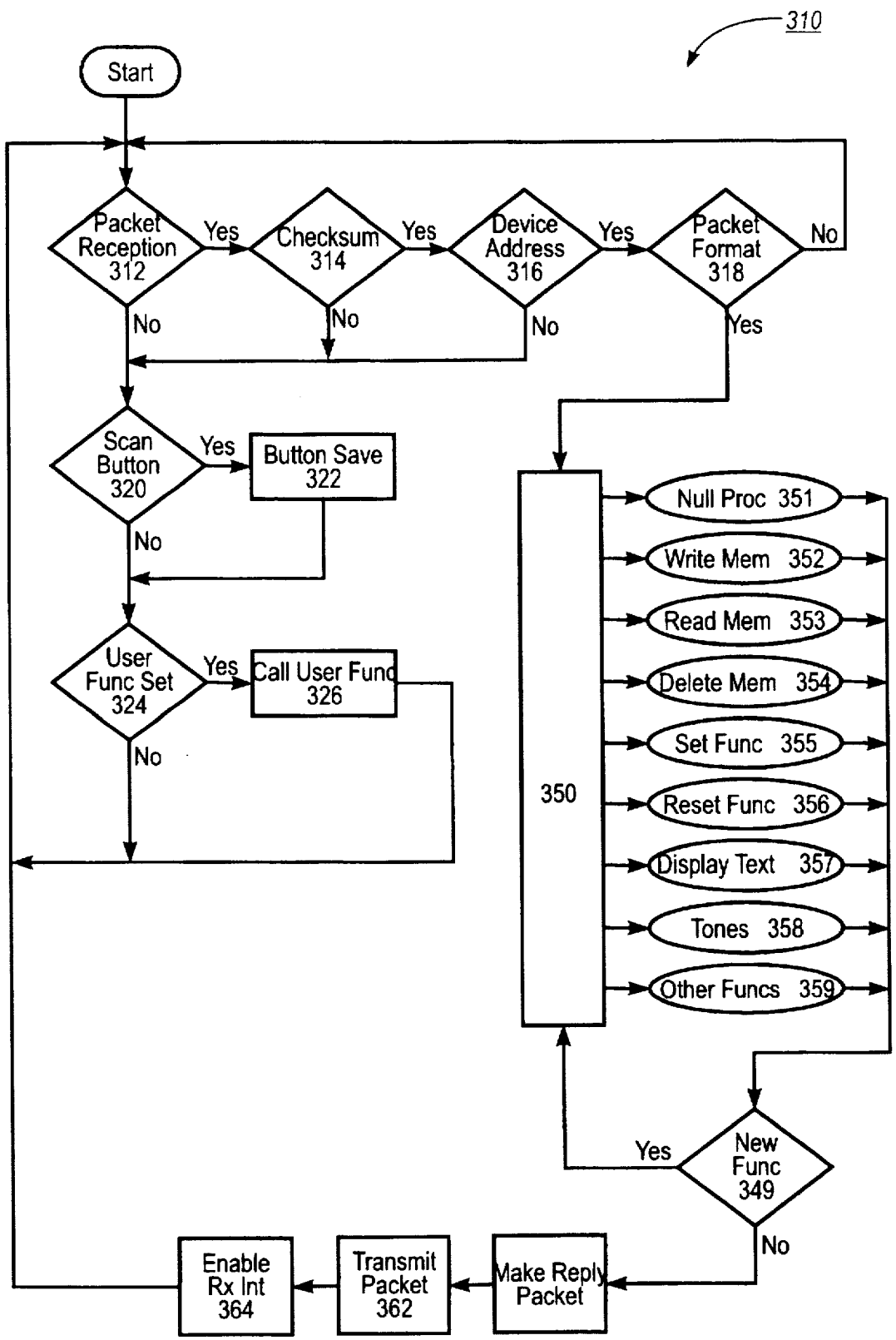
FIG. 8 is a detailed flow chart illustrating control logic for the personal storage device illustrated in FIGS. 6 and 7.

After the power-up activity the device 90 enters a main polling loop 310 as illustrated in FIG. 8. This main polling loop waits for switch presses, or the reception of a packet of data through the LED and infrared (IR) receiver amplifier 247 of infrared transceiver 96 in FIG. 7. Alternatively, the main polling loop 310 can respond to a registered user defined procedure. Received IR packets are processed through the interrupt routine of processor 240 of FIG. 7. The LED and IR receiver amplifier 247 convert pulses of IR light into corresponding electrical pulses that are fed into an interrupt pin of the processor. The format of these pulses conforms to the physical and link layer formats (IrLAP) described in the industry standard Infrared Data Association IrDA specification, version 1.0, the disclosure of which is herein specifically incorporated by reference. As the bits are received the interrupt procedure is called for each one, resulting in the assemblage of received bits into bytes, and bytes into a packet, whereupon the main loop 310 of FIG. 8 is notified.

As seen in FIG. 8, after packet reception 312 the packet is examined for a valid IrLAP packet format, including a checksum 314 to establish data integrity, evaluation of device address 316 and check of packet format 318. If any of these tests fail and a valid packet was not received, the buttons on the device 90 are scanned for button presses (scan button 320). If a button was pressed, the last button state is saved (button save 322). This button state can be passed on to determine if a user definable function was being invoked (user func set 324 and call user func 326), whereupon the device 90 returns to start to wait for additional reception of packets.

In the alternative, if a valid packet was received that passes tests 312, 314, 316, 318, the payload of the valid IrLAP packet is passed to a decode procedure 350 that decodes its contents and determines the nature of the request it represents. Then, a single procedure out of a number of possible procedures is called to modify state of the device 90 (except of course for a null procedure call 351). For instance, the called procedure may cause the device 90 to have its memory written (write mem 352), memory read (read mem 353), or memory deleted (delete mem 354). Alternatively, the called procedure may establish or reset the definition of a user-defined-function (respectively set func 355 and reset func 356), write text to the display (display text 357), or generate a sequence of tones from the piezo-speaker (tones 358). Other user defined procedure function calls may also be utilized if necessary or desired (Other funcs 351), and additional functions can be added to extend the functionality of decode proc 350 by use of a call to new func 349.

After executing the function, the packet is examined for other procedure calls and each procedure call is executed in turn until a packet termination symbol is found. At this time a reply packet is assembled (make reply packet 360). The reply packet contains the results of executing the received packet (in many cases this may just be an acknowledgment of success). The reply packet is then serially transmitted (transmit packet 362 and enable Rx Int 364 of FIG. 8)out of the LED and IR transmitter amplifier 248 of IR transceiver 96 (of FIG. 7) in accordance with formats defined by the IrDA specification previously discussed and incorporated by reference.

In a most preferred embodiment suitable for intermittent communication often encountered when using devices according the present invention, a remote procedure call (RPC) type interface can be layered atop the IrLAP defined subset of the link layer protocol. RPC type packets incorporate a sequence number that ensures idempotent operation. This allows the client of the RPC, such as another personal storage device or a personal computer, to retry the requests, after a suitable time-out, without being subject to errant behavior that might otherwise result from receiving the same request twice.

In a typical operating session, after receiving a number of RPC type packets, the device 90 might contain new executable code and data that is loaded into its memory. A "call user function 326" request such as previously discussed will establish one of these pieces of code in such a way that it is called from the processor main-loop. The device 90 can now execute this newly loaded code, which may include features such as sending IR packets to some other device in response to pressing the switches. As previously discussed, the ability to download data and executable applications on demand permits simple updating of data files and lists such as might be needed for an electronic address book. For example, new data can be downloaded into the electronic diary or the data management executable of the electronic diary can itself be changed. This would greatly increase the flexibility of data presentation. As another example, a user of device 90 could search extremely large alphanumerically orderable lists maintained on computer network accessible databases, using only a single button 94 during search. Of course, any of the other functions previously discussed in the present specification or apparent to those skilled in the art can also be subject to "on demand" data or executable application downloading or updates. The loading protocol can also be used to add new functions to the decode table 350, thus allowing new RPC functionality across the infrared link.

As those skilled in the art will appreciate, other various modifications, extensions, and changes to the foregoing disclosed embodiments of the present invention are contemplated to be within the scope and spirit of the invention as defined in the following claims.

The claimed invention is:

1. A method for one button searching of an alphanumerically ordered list too large to permit simultaneous individual display of each list member within a predetermined display area, comprising the steps of depressing a first search button to initiate a first mode scrolling search of a plurality of list members ordered in a list, with each list member sequentially displayed, initiating a second mode scrolling search after maintenance of the first search button in a depressed state and elapse of a first predetermined time interval, with a selected subset of list members, each having a same first letter, ordered by their second letters for sequential display, and commencing a third mode scrolling search after maintenance of the first search button in a depressed state and elapse of a second predetermined time interval, with selected subset of list members ordered by their first letter sequentially displayed.

2. The method of claim 1, further comprising the step of providing a selection button distinct from the first search button to select a list member displayed on a selection line.

3. The method of claim 1, further comprising the step of providing a second search button to initiate scrolling search through the plurality of list members ordered in a list in a reverse order.

4. The method of claim 1, further comprising the step of sequentially displaying list members on a display screen having less than about ten lines available for presentation of alphanumeric characters.

5. The method of claim 1, wherein both the first and the second predetermined time intervals are about one second in duration.

6. The method of claim 1, further comprising the step of dropping back to the second mode scrolling search from the third mode scrolling search after release of the first search button from its depressed state and elapse of a third predetermined time interval.

7. The method of claim 6, wherein the third predetermined time interval is about one second in duration.

8. The method of claim 1, further comprising the step of dropping back to the first mode scrolling search from the second mode scrolling search after release of the first search button from its depressed state and elapse of a fourth predetermined time interval.

9. The method of claim 8, wherein the fourth predetermined time interval is about one second in duration.

10. An apparatus for accessing list members of an alphanumerically ordered list too large to permit simultaneous individual display of each list member within a predetermined display area, the apparatus comprising a display unit having a predetermined area configured to accommodate a limited number of list members, a user input device for initiating search of the list, the user input device being connected to a timer for measuring duration of user input, a processor and memory unit connected to receive data from the user input device, the processor being further connected to the display unit to control display of representations of list members, with the processor operated to execute instructions that provide for beginning a first mode scrolling search of the plurality of ordered list members in response to activation of the user input device, with each list member sequentially displayed by the display unit, initiating a second mode scrolling search after continued activation of the user input device for a determined duration as measured by the timer, with a selected subset of list members, each having a same first letter, ordered by their second letters for sequential display and initiating a third mode scrolling search after continued activation of the user input device for a determined duration as measured by the timer, with selected subset of list members ordered by their first letter sequentially displayed.

11. The apparatus of claim 10, further comprising a module for wireless reception and transmission of data, with the module connected to the processor to allow active searching of lists not entirely present in the memory unit.

* * * * *